Aug. 28, 1951
A. N. NILSON
2,566,031
LATCH OPERATED CLUTCH
Filed April 17, 1948
2 Sheets-Sheet 1
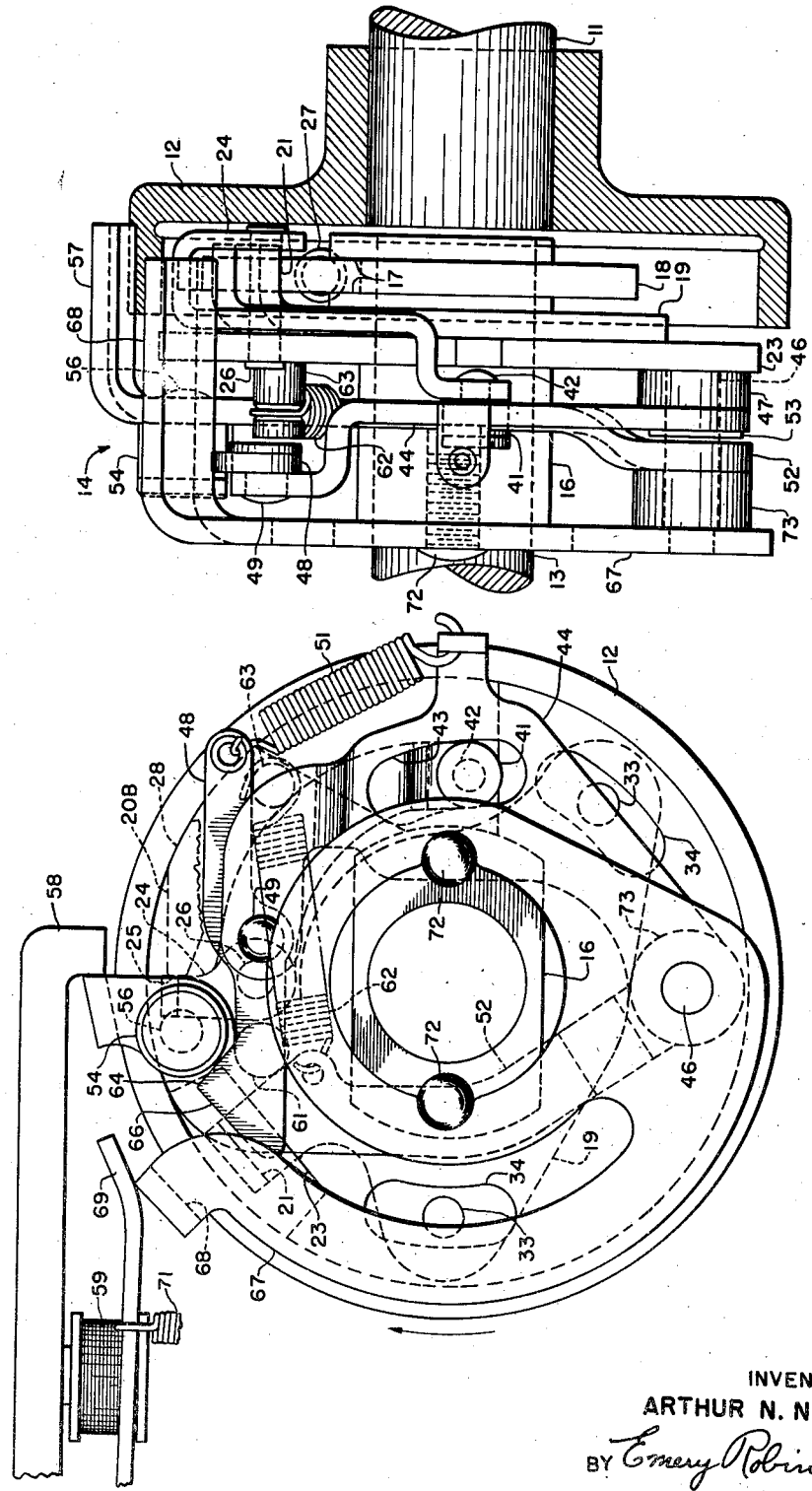
INVENTOR
ARTHUR N. NILSON
BY *Emery Robinson*
ATTORNEY Aug. 28, 1951  A. N. NILSON  2,566,031
LATCH OPERATED CLUTCH
Filed April 17, 1948  2 Sheets-Sheet 2

INVENTOR
ARTHUR N. NILSON
BY Emery Robinson
ATTORNEY

Patented Aug. 28, 1951

2,566,031

UNITED STATES PATENT OFFICE 2,566,031

LATCH OPERATED CLUTCH

Arthur N. Nilson, Chicago, Ill., assignor to Teletype Corporation, Chicago, Ill., a corporation of Delaware Application April 17, 1948, Serial No. 21,639

17 Claims. (Cl. 192—26)

This invention relates to clutches and more particularly to clutches of the single revolution type.

In clutches of the single revolution type and particularly those designed for use in start-stop telegraph apparatus it is desirable that they be rapid and uniform in operation. It is essential that there be no slippage between the drive and driven members during rotation, and it is further essential, in order to prevent excessive wear between the drive and driven members, that the members be positively disengaged from each other when they are not in clutching engagement.

Accordingly it is a primary object of this invention to provide a clutch wherein slippage between the drive and driven members is substantially eliminated when the members are in clutching engagement, and wherein the friction surfaces of the drive and driven members are positively disengaged when the driven member is stopped.

The principle of operation of the clutch disclosed in the copending application of A. N. Nilson et al., Serial No. 707,176, filed November 1, 1946, in the U. S. Patent Office, is employed in the clutch shown herein; however, the present invention is an improvement over the clutch shown in the Nilson et al. application. The clutch disclosed in the Nilson et al. application is very efficient at moderate and high speeds, and at these speeds the driven member is disengaged from the drive member which prevents the aforementioned wear between these parts of the clutch. But positive disengagement of the clutch parts in the Nilson et al. application is dependent upon the momentum of a latching mechanism after the driven member is engaged by a stop member. The momentum of the latching mechanism, being a function of its rotational speed, is sufficient, when the clutch parts are rotated at moderate and high speeds, to cause the positive disengagement of the clutch parts. But when the Nilson et al. clutch is rotated at reduced speeds the momentum of the latching mechanism is insufficient to cause the positive disengagement of the clutch parts when the driven member is engaged by a stop member.

In the present invention the driven member of the clutch includes an expansible type shoe for engaging the drive member with a frictional force greatly in excess of the force initially applied to cause the shoe to engage the drive member. Carried by the driven member is a stop arm which engages a stop member when rotation of the driven member is to be stopped. The shoe remains in clutching engagement with the drive member until a latch on the driven member has advanced to a predetermined point in the rotation of the driven member, at which time, if the stop arm has been engaged by the stop member the shoe is very rapidly disengaged from the drive member. At the same time that the shoe is disengaged from the drive member the latch is engaged by a latch stop which holds the shoe disengaged from the drive member until the stop arm is released by the stop member. Release of the stop member from engagement with the stop arm allows the shoe to engage the drive member substantially immediately.

According another object of the invention is to provide a clutch having means for positively disengaging the driven member from the drive member regardless of the speed of rotation of the clutch.

A further object of the invention is to provide a clutch having means for disengaging the clutch parts which is ineffective to disengage the clutch parts until a predetermined point in the rotation of the driven member has been reached.

A still further object of the invention is to provide a clutch having a double faced cam lever on the driven member thereof which cooperates with a stop arm to enable the disengagement of the driven member from the drive member when the stop arm is engaged by a stop member.

Still another object of the invention is to provide a clutch having a cam slot in one of the members comprising the driven portion of the clutch which controls a clutching member when a clutch stop member is operated to cause respectively the engagement or disengagement of the driven portion from the drive member upon blocking or release of the clutch stop member.

These and other objects and advantages of the invention will become apparent and the invention will be understood more readily from the following description when read in conjunction with the accompanying drawings in which:

Fig. 1 is a front elevational view of the clutch;

Fig. 2 is a right side elevational view shown partly in section;

Figure 3:
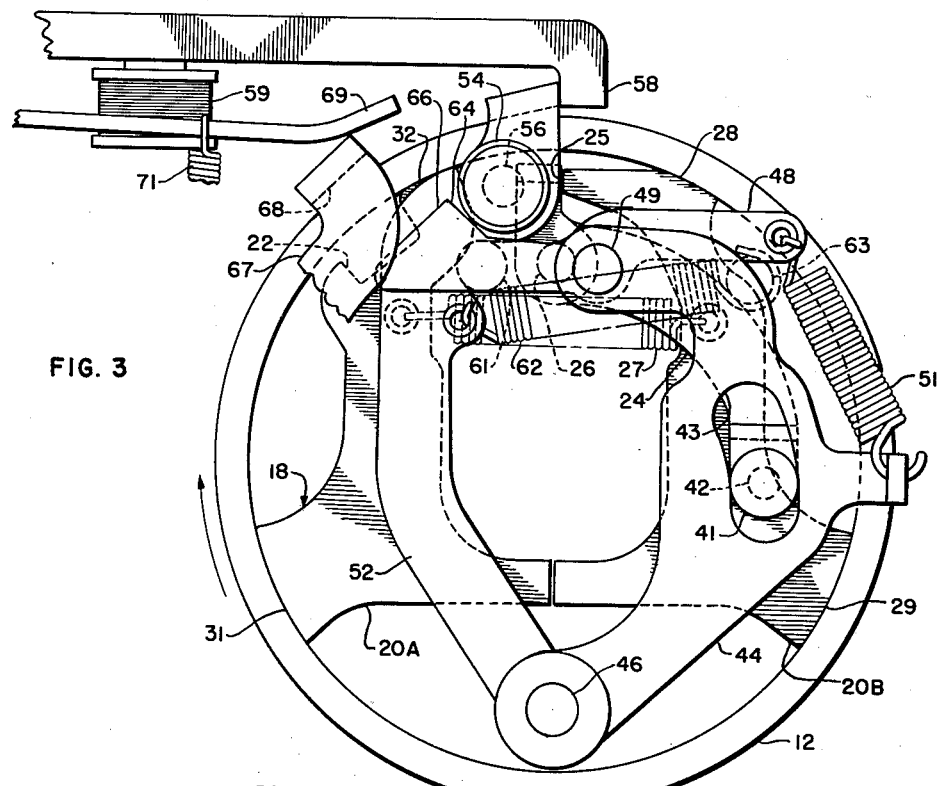
Figure 4:
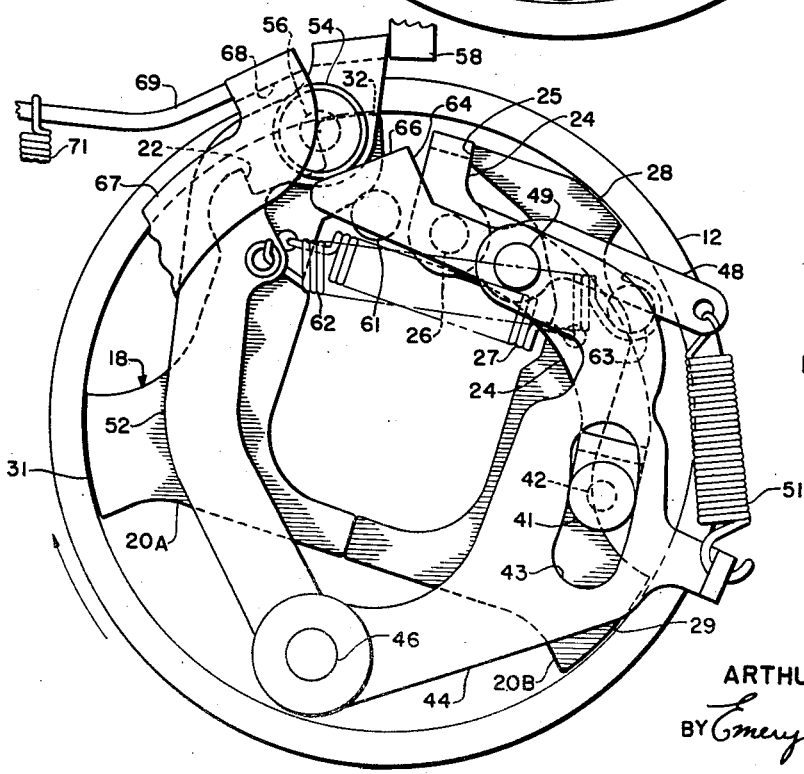

Fig. 3 is a front view of the clutch showing the relative positions of the principal operating parts during rotation of the driven member or the position of the parts at the instant of engagement of the stop member with the stop arm on the driven member; and Fig. 4 is a front view of the clutch showing the relative positions of the same parts of the clutch, as are shown in Fig. 3, when the driven member has been stopped.

The friction clutch comprising this invention, as has been stated heretofore, has a driving drum and a driven member having an expansible shoe connected thereto adapted to engage the drum. A stop arm, carried by the driven member, carries a roller which cooperates with a double faced cam lever to cause the positive disengagement of the shoe from the drum. During rotation of the driven member the roller is positioned against one face of the double faced cam lever and when the driven member is held stopped the roller is positioned against the other face of the double faced cam lever. When the stop arm is engaged by the stop member the roller moves relative to the cam lever until it reaches the apex of the two cam surfaces, at which time a spring is disposed to pivot the cam lever. At this time, because the opposite cam surface is adjacent the roller and due to the tendency of the spring to pivot the cam lever, the result is a substantially longitudinal displacement of the cam lever. As the cam lever is moved in this manner a second lever, having a cam slot therein and connected pivotally to the cam lever, is displaced slightly. A clutch lever for expanding or contracting the shoe carries a roller which rides within the cam slot so that movement of the second lever pivotally causes the shoe to be either engaged or disengaged from the drum.

Referring now to the drawings, a drive shaft 11 has a driving member or drum 12 secured thereto and is driven by any convenient source of power. A driven shaft 13 is aligned axially with the drive shaft 11 and carries a driven member 14. A sleeve 16, secured to the driven shaft 13, has a pair of collars 17, mounted between which is an engaging member or a two part clutch shoe 18 having clutch parts 20A and 20B. A member 19, having a right angled portion 21, is secured to the sleeve 16 and the right angled portion 21 cooperates with a cutout 22 (Figs. 3 and 4) in the clutch part 20A to mount the clutch shoe pivotally but fixedly with relation to the sleeve 16. A plate 23 is secured to the member 19 by a pair of bolts 33 which extend through adjusting slots 34 in the plate 23 and into the member 19. A clutch lever 24 is secured pivotally to the plate 23 by the means of a bolt 26 and cooperates with a surface 25 on the second part 20B of the two part clutch shoe 18. A convenient means is provided by the bolt 33 and slot 34 connection between the plate 23 and member 19 for compensating for wear. Rotation of the plate 23 clockwise relative to the member 19 expands the shoe 18 and vice versa, by merely increasing or decreasing the distance between the cutout portion 22 and the surface 25 of the shoe 18.

The two parts 20A and 20B of the two part clutch shoe 18 are urged continuously towards one another by a suitable spring 27 and, since the part 20A is held fixed rotatably with respect to the collars 17, by the right angled portion 21 of the member 19, the other part 20B of the shoe 18 is held against the clutch lever 24. When the clutch lever 24 is pivoted clockwise on its pivot bolt 26 (referring to Fig. 3) a certain force will be exerted substantially horizontally against the surface 25 and transferred to an engaging portion 28 of the shoe 18. Due to the angle at which the engaging portion 28 meets the drum 12 the force of frictional engagement therebetween is multiplied. A force greater than the applied force is then transmitted substantially at right angles to the applied force of the clutch lever 24 towards an engaging portion 29 of the shoe 18. Due to the angle between the portion 29 and the drum 12 the force transmitted thereto is multiplied so that the force of frictional engagement therebetween is greater than the force transmitted thereto. The shoe 18, being held in a fixed position by the right angled portion 21 relative to the clutch lever 24, and the shoe 18 further being symmetrical, the engaging portion 29 engages the drum 12 with the same frictional force as an engaging portion 31 and the engaging portion 28 engages the drum 12 with the same frictional force as an engaging portion 32.

The clutch lever 24 carries a roller 41 secured rotatably thereto by a bolt 41 and this roller 42 rides in a cam slot 43 in a lever 44. The lever 44 is secured pivotally to the plate 23 by a bolt 46 and is held in spaced relation to the plate 23 by a spacer sleeve 47 about the bolt 46. A double faced cam lever 48 is secured pivotally to the lever 44 by a bolt 49 and is biased clockwise relative to the lever 44 by a spring 51 secured suitably to the levers 44 and 48. A stop arm 52 is also mounted pivotally on the bolt 46 and is spaced suitably from the lever 44 by a washer 53. The stop arm 52 carries a roller 54 secured thereto by a bolt 56 and has a bent over portion 57 which cooperates with a stop member 58. The stop member 58 may be controlled by a magnet 59 or by any other suitable means. When the driven member 14 is rotating with the driving drum 12, the stop arm abuts a stud 61 secured to the plate 23. The stop arm 52 is maintained in abutting relation with the stud 61 by a spring 62 secured at its other end to a stud 63 mounted on the plate 23.

The double faced cam lever 48 has two cam faces 64 and 66 thereon with which the roller 54 cooperates when the shoe 18 is respectively engaged and disengaged from the driving drum 12. When the stop member 58 first engages the bent over portion 57 of the stop arm 52 the shoe 18 continues to engage the drum 12 so that the driven member 14 continues to be advanced. During such advancement of the driven member 14 the stop arm 52 is held fixed and consequently the cam lever 48 is moved to the right relative to the stop arm 52. The cam face 64, being in engagement with the roller 54 at the time when the stop arm 52 first engages the stop member 58, cooperates with the roller 54 to cause the cam lever 48 to be pivoted counterclockwise about the bolt 49. When the peak of the cam face 64 is overridden, the spring 51 urges the cam lever 48 clockwise about its pivot bolt 49, but such movement of cam lever 48 is opposed by the roller 54 which engages the cam face 66 of the cam lever. Therefore, as the spring 51 contracts in tending to rotate the cam lever 48 clockwise, the cam face 66 is moved to the right past the roller 54 so that the cam lever moves substantially longitudinally until it assumes the position shown in Fig. 4.

A latch 67 is mounted securely on the sleeve 16 by a pair of bolts 72 and is secured to the bolt 46. A spacer sleeve 73 maintains the stop arm 52 and latch 67 in proper spaced relation. The latch 67 has a bent over portion 68 which cooperates with a latch stop 69 which is at all times urged towards the drum 12 by a spring 71. The latch stop 69 is of such configuration that it will be cammed away from the drum 12 by the bent over portion 68 of the latch 67 when it passes beneath the latch stop 69 during rotation of the driven member 14. The driven member 14 is rotated by the driving drum 12 until the latch stop 69 is brought into latching cooperation with the bent over portion 68 due to the fact that the roller 54 does not override the peak of cam surface 64 until after the latch stop 69 is drawn behind the bent over portion 68 by the spring 71. Therefore, the clutch shoe 18 is positively disengaged from the drum 12 whenever the stop member 58 engages the stop arm 52, regardless of the speed of rotation of the driven member 14.

Following is a brief description of the operation of the clutch forming the subject matter of the invention. Referring to Figs. 3 and 4, particularly wherein it is assumed that the drum 12 is rotating continuously, Fig. 3 represents the position of the principal parts while the driven portion of the clutch is rotating with the driving drum 12. Fig. 4 represents the position of the same parts when the stop arm 52 is held stopped by the stop member 58 and the bent over portion 68 of the latch 67 is held in latched position by the latch stop 69.

When the driven member 14 is to be prevented from rotating, the magnet 59 is energized to draw the stop member 58 to the position as shown in Figs. 3 and 4. The stop arm 52, upon engaging the stop member 58, is prevented from rotating further with the other parts of the driven member 14, thus causing the stop arm 52 to move counterclockwise about the bolt 46 to the position shown in Fig. 4. The roller 54, carried by the stop arm 52, causes the cam lever 48 to be pivoted counterclockwise about the pivot bolt 49 until the roller 54 overrides the apex of the two cam faces 64 and 66. At this time the driven member 14 will have been rotated clockwise to the point where the latch stop 69 slips behind the latch 67, due to the action of the latch stop spring 71. The stop arm 52 and the latch 67 are held in the positions thereof, shown in Fig. 4, until the stop member 58 is again withdrawn from engagement with the stop arm 52.

When the roller 54 has reached the point where it overrides the apex of the cam faces 64 and 66, the spring 51 pivots the cam lever 48 clockwise and, due to the effect of the cam surface 66 cooperating with the roller 54, the cam lever 48 is moved substantially longitudinally to pivot the lever 44 clockwise slightly about the bolt 46. This movement of the lever 44 cams the roller 41 to the right (Fig. 4) moving the clutch lever 24 counterclockwise about its pivot bolt 26 to the position thereof shown in Fig. 4. This allows the spring 27 to contract the shoe 18 withdrawing the engaging portions 28, 29, 31 and 32 from frictional engagement with the drive drum 12. The shoe 18 is at this time completely disengaged from the driving drum 12.

When the magnet 59 is de-energized, the driven member 14 having been stopped previously, the stop member 58 is moved from engagement with the stop arm 52 which allows the spring 62 to contract and move the stop arm clockwise about its pivot bolt 46. As the stop arm 52 is moved in this manner the cam lever 48 is pivoted counterclockwise about its pivot bolt 49 and the roller 54 rides over the cam surface 66 until it overrides the apex of the cam surfaces 64 and 66. Immediately thereafter the spring 51 urges the cam lever 48 in a clockwise direction about the pivot bolt 49, and due to the camming effect of the cam surface 64 against the roller 54, the cam lever 48 moves substantially longitudinally to pivot the lever 44 counterclockwise slightly. The cam slot 43 in the lever 44 cooperates with the roller 41 to pivot the clutch lever 24 clockwise at this time, thus expanding the shoe 18 until the engaging surfaces 28, 29, 31 and 32 engage the rotating drum 12.

It will be understood that the embodiment of the invention shown and described is merely illustrative of the principles involved and numerous modifications and changes may be made without departing from the spirit of the invention.

What is claimed is:

1. In a clutch, a continuously rotating drive means, driven means cooperable with said drive means in a manner for effecting rotation of said driven means, control means including cooperating cam and roller means normally operable for effecting the cooperation of said drive and driven means, a member operable under certain operating conditions for cooperating with said control means to enable said cam and roller means to effect noncooperation of said drive and driven means, and means effective previous to the operation of said manner to retain said drive and driven means in noncooperative relation.

2. In a clutch, a driving member, driven means including an expansible shoe for engaging said driving member to effect rotation of said driven means with said driving member, means for expanding said shoe for enabling the engagement between said shoe and said driving member, and cam means for controlling said shoe expanding means to insure the disengagement between said shoe and said driving means at a predetermined point in the rotation of said driven means.

3. In a clutch, a driving member, driven means including an engaging member for engaging said driving member to effect rotary movement of said driven means with said driving member, operating means for enabling the engagement between said engaging member and said driving member, and cam means for controlling said operating means to insure the disengagement between said engaging member and said driving means at a predetermined point in the rotation of said driven means.

4. In a clutch, a driving member driven means including an engaging member for engaging said driving member to effect rotation of said driven means, operating means for applying a force to said engaging member to enable the engagement of said engaging member with said driving member, said engaging member designed to engage said driving member with a force greater than the force applied by said operating means, and cam means for controlling said operating means to insure the disengagement between said engaging member and said driving means at a predetermined point in the rotation of said driven means.

5. In a clutch, a driving member, driven means including an engaging member for engaging said driving member to effect rotation of said driven means, a clutch member for enabling the engagement of said engaging member with said driving member, cam means for controlling said clutch member, said clutch member normally causing said engaging member to be disengaged from said driving member, and a releasable stop mechanism cooperating with said cam means when said releasable stop mechanism is released to cause said clutch member to enable the engagement of said engaging member with said driving member.

6. In a clutch, a driving member, driven means including a two part expansible shoe for engaging said driving member, a clutch lever for enabling the engagement of said shoe with said driving member to effect rotation of said driven means with said driving member, cam means for controlling said clutch lever said clutch lever normally causing said shoe to be disengaged from said driving member, and a releasable stop mechanism cooperating with said cam means when said releasable stop mechanism is released to cause said clutch lever to enable the engagement of said shoe with said driving member.

7. In a clutch, a driving member, driven means including a two part expansible shoe for engaging said driving member to effect rotation of said driven means with said driving member, a clutch lever for enabling the engagement and disengagement of said shoe with said driving member, cam means for controlling said clutch lever, and a stop mechanism for actuating said cam means to cause the disengagement of said shoe with said driving member.

8. In a clutch, a driving member, driven means including an engaging member for engaging said driving member to effect rotation of said driven means with said driving member, a clutch lever means for enabling the engagement and disengagement of said engaging member with said driving member, means including a double faced cam lever for controlling the operation of said clutch lever, and a stop mechanism having a roller for cooperating with said double faced cam lever, whereby said cam lever causes said clutch lever to enable the engagement of said engaging member with said driving member when said roller engages one face of said double faced cam lever and said cam lever causes said clutch lever to enable the disengagement of said engaging member with said driving member when said roller engages the other face of said double faced cam lever.

9. In a clutch, driving means, driven means including a shoe having a plurality of engaging surfaces for engaging said driving means, a clutch lever for applying a force to said shoe to enable the engagement of said engaging surfaces with said driving means to effect rotation of said driven means with said driving means, at least one of said engaging surfaces engaging said driving means with a frictional force greater than that applied by said clutch lever and transmitting a force to a second engaging surface, said transmitted force being greater than that force applied by said clutch lever, said second engaging surface engaging said driving means with a frictional force greater than that force transmitted thereto by said first named engaging surface, means including a double faced cam lever for controlling the operation of said clutch lever, and a stop mechanism having a roller for cooperating with said double faced cam lever, whereby said double faced cam lever causes said clutch lever to apply said force to said shoe to enable the engagement of said engaging surfaces with said driving means when said roller engages one face of said double faced cam lever and said double faced cam lever prevents the application of said force to said shoe by said clutch lever to thereby effect disengagement between said engaging surfaces and said driving means when said roller engages the other face of said double faced cam lever.

10. In a clutch, driving means, driven means including a symmetrical two part shoe having a plurality of engaging surfaces for engaging said driving means, a clutch lever for applying a force to said shoe to enable the engagement of said engaging surfaces with said driving means to effect rotation of said driven means with said driving means, one group of said plurality of engaging surfaces engaging said driving means with a frictional force greater than that applied by said clutch lever and transmitting a force to a second group of said engaging surfaces, said transmitted force being greater than that force applied by said clutch lever, said second group of said engaging surfaces engaging said driving means with a frictional force greater than that force transmitted thereto by said first group of said engaging surfaces, means including a double faced cam lever for controlling the operation of said clutch lever, and a stop mechanism having a roller for cooperating with said double faced cam lever, whereby said double faced cam lever causes said clutch lever to apply said force to said shoe to enable the engagement of said engaging surfaces with said driving means when said roller engages one face of said double faced cam lever and said double faced cam lever prevents the application of said force to said shoe by said clutch lever to thereby effect disengagement between said engaging surfaces and said driving means when said roller engages the other face of said double faced cam lever.

11. In a clutch, driving means, driven means including an engaging member for engaging said driving means to effect rotation of said driven means with said driving means, a clutch lever for applying a force to said engaging member to enable the engagement thereof with said driving means, whereby said engaging member multiplies the applied force and frictionally engages said driving means with said multiplied force, means for disengaging said engaging member from said driving means, stop means for engaging the driven means at a predetermined point in the rotation thereof, and cam means rendered operable upon the engagement of said stop means with said driven means for controlling said clutch lever to prevent the application of the applied force by said clutch lever, whereby said disengaging means is thereby rendered effective to disengage said engaging member from said driving means.

12. In a clutch, driving means, driven means including an engaging member for engaging said driving means to effect rotation of said driven means with said driving means, a clutch lever for enabling the engagement and disengagement of said engaging member with said driving member, means including a double faced cam lever for controlling the operation of said clutch lever, a stop mechanism mounted on said driven means having a roller for cooperating with said double faced cam lever, whereby said cam lever causes said clutch lever to enable the engagement of said engaging member with said driving member when said roller engages a first face of said double faced cam lever and said cam lever causes said clutch lever to enable the disengagement of said engaging member with said driving member when said roller engages a second face of said double faced cam lever, a stop member for engaging said stop mechanism to cause said roller to be moved from engagemet with said first face of said double faced cam lever to said second face thereof to thereby cause disengagement of said engaging member from said driving means, a latching means carried by said driven means, and a latch stop cooperating with said latching means and effective upon the disengagement of said engaging member from said driving means to cause said roller to be maintained in engagement with said second face of said double faced cam lever.

13. In a clutch, a driving member, driven means including an engaging member for engaging said driving member to effect rotation of said driven means with said driving member, a clutch lever for enabling the engagement and disengagement of said engaging member with said driving member, an intermediate lever having a cam slot therein cooperating with a roller on said clutch lever to control said clutch lever, a double faced cam lever, and a stop mechanism having a roller thereon for cooperating with said double faced cam lever for controlling said intermediate lever, whereby said cam lever actuates said intermediate lever to cause said clutch lever to enable the engagement of said engaging member with said driving member when said roller engages one face of said double faced cam lever and said cam lever actuates said intermediate lever to cause said clutch lever to enable the disengagement of said engaging member from said driving member when said roller engages the other face of said double faced cam lever.

14. In a clutch, a driving drum, a driven member engageable with said driving drum to effect rotation of said driven member, cam means carried by said driven member positionable in a plurality of positions, said cam means when in a first position being effective to cause engagement of said driven member with said driving drum and when in a second position being effective to cause disengagement of said driven member from said driving drum, stop means carried by said driven member and cooperable with said cam means to position said cam means, control means cooperable with said stop means to control the positionment of said cam means, latchable means carried by said driven member and latching means cooperable with said latchable means to retain said cam means in said second position, said control means being ineffective to cooperate with said stop means to cause the positioning of said cam means in said second position prior to the latching of said latchable means by said latching means.

15. In a clutch, a rotatable drive member, a driven member engageable with said drive member to effect rotation of said driven member, means carried by said driven member for controlling the engagement of said drive and driven members, control means for engaging said first recited means at a predetermined point in the rotation of said driven member, said control means being effective upon engagement with said first recited means to move said first recited means and ultimately cause disengagement of said drive and driven members, and a latching means effective at a point in the rotation of said driven member precedent to the ultimate disengagement of said drive and driven members for positively retaining said drive and driven members in disengaged relation.

16. In a clutch, a rotatable drive member, a driven member engageable with said drive member to effect rotation of said driven member, means having a roller thereon carried by said driven member, cam means carried by said driven member cooperable with said roller for together controlling the engagement of said drive and driven members, control means for engaging said first recited means at a predetermined point in the rotation of said driven means, said control means being effective upon engagement with said first recited means to move said first recited means to thereby cause said roller and cam means to ultimately effect disengagement of said drive and driven members, and a latching means effective at a point in the rotation of said driven member precedent to the ultimate disengagement of said drive and driven members for positively retaining said drive and driven members in disengaged relation.

17. In a clutch, a rotatable drive member, a driven member engageable with said drive member to effect rotation of said driven member, a cam carried by said driven member and movable relative thereto for controlling the engagement of said drive and driven members, means carried by said driven member and cooperable with said cam, control means for engaging said first recited means at a predetermined point in the rotation of said driven means, said control means being effective upon engagement with said first recited means to cause movement of said cam to thereby ultimately effect disengagement of said drive and driven members, and a latching means effective at a point in the rotation of said driven member precedent to the ultimate disengagement of said drive and driven members for positively retaining said drive and driven members in disengaged relation.

ARTHUR N. NILSON.

REFERENCES CITED

The following references are of record in the file of this patent:

UNITED STATES PATENTS

| Number | Name | Date |
|---|---|---|
| 553,983 | Heath et al. | Feb. 4, 1896 |
| 2,210,459 | Knochl | Aug. 6, 1940 |